United States Patent [19]
McCleary et al.

[11] Patent Number: 5,729,163
[45] Date of Patent: Mar. 17, 1998

[54] SYNCHRONOUS AC TO DC CONVERSION OF DIFFERENTIAL AC SIGNALS

[75] Inventors: Rex McCleary, Anacortes; Daniel Dean Thacker, Sultan, both of Wash.

[73] Assignee: The Boeing Company, Seattle, Wash.

[21] Appl. No.: 627,957

[22] Filed: Apr. 3, 1996

Related U.S. Application Data

[63] Continuation of Ser. No. 324,873, Oct. 18, 1994, abandoned.
[51] Int. Cl.$^6$ ............................................. G05F 1/10
[52] U.S. Cl. ........................ 327/104; 327/536; 307/110; 307/48
[58] Field of Search ......................... 327/104, 331, 327/390, 589, 536, 537; 307/48, 110

[56] References Cited

U.S. PATENT DOCUMENTS

| | | | |
|---|---|---|---|
| 3,036,273 | 5/1962 | Holbrook et al. | 329/50 |
| 3,302,121 | 1/1967 | Schmid | 330/7 |
| 3,327,233 | 6/1967 | Darlington | 330/7 |
| 3,526,821 | 9/1970 | Thomas | 307/110 |
| 4,507,625 | 3/1985 | Lee et al. | 332/31 |
| 5,036,954 | 8/1991 | Chan et al. | 307/110 |
| 5,132,895 | 7/1992 | Kase | 307/110 |
| 5,187,421 | 2/1993 | Naito | 307/110 |

FOREIGN PATENT DOCUMENTS

| | | |
|---|---|---|
| 61-264812 | 11/1986 | Japan . |
| 621-083 | 3/1977 | U.S.S.R. . |
| 1431-057-A | 12/1986 | U.S.S.R. . |

OTHER PUBLICATIONS

J.E. Gersbach, Sampled Charge Amplifier, IBM Technical Disclosure Bulletin, vol. 17, #9, Feb. 1975, pp. 2601–2602.

*Primary Examiner*—Timothy P. Callahan
*Assistant Examiner*—Jung Ho Kim
*Attorney, Agent, or Firm*—Christensen O'Connor Johnson & Kindness PLLC

[57] ABSTRACT

AC to DC signal conversion for use in applications including conditioning of signals supplied by inductive position sensors that are employed in aircraft electrical and electronic systems. First and second switching circuits (14 and 16) are synchronously switched between operational states in which an applied AC signal is supplied to the switching circuits and a second operational state in which the switching circuits supply charge (current). When one switching circuit (e.g., 14) is in the first operational state, the second switching circuit (e.g., 16) is in the second operational state so that one switching circuit senses the AC signal during positive half cycles and the other switching circuit senses the AC signal during negative half cycles. A pair of capacitors (18 and 20) are connected between a pair of output terminals. The first switching circuit (14) charges one capacitor (18) when the first switching circuit is in its second operational state and the second switching circuit (16) charges the other capacitor (20) when the second switching circuit is in its second operational state. A buffer amplifier (22) can be used for receiving the signal developed across the capacitors (18 and 20) to thereby provide isolation relative to a circuit or system that is connected for receiving the DC signal supplied by the AC to DC signal conversion.

16 Claims, 6 Drawing Sheets

SYNCHRONOUS AC TO DC CONVERSION OF DIFFERENTIAL AC SIGNALS

This application is a continuation application based on prior application Ser. No. 08/324,873, filed on Oct. 8, 1994, abandoned.

FIELD OF THE INVENTION

This invention relates to circuit arrangements for synchronous transformation of an AC differential signal to a DC signal in which the magnitude of the DC signal that is produced is representative of the amplitude or phase of the AC differential signal that is applied to the circuit. More specifically, this invention relates to synchronous AC-DC transformation of the type in which switched capacitors are charged in alternation with one another with the period of time that each capacitor is charged being equal to one-half the period of the applied AC signal.

BACKGROUND OF THE INVENTION

There are numerous situations in which switched capacitor circuit arrangements are used to supply a DC signal that is representative of the amplitude (or phase) of an applied AC signal. For example, circuitry of this general type often is employed to demodulate amplitude or phase modulated signals; as a full-wave synchronous rectifier circuit; and as signal conditioning circuitry for a wide variety of transducers and sensors.

Some of the more demanding signal conditioning situations occur in aircraft electrical and electronic systems in which remotely located sensors and transducers provide system input signals. For example, modern commercial aircraft utilize a large number of inductive position sensors such as proximity sensors and linear variable differential transformers (LVDT's) to indicate the position of control surfaces (flaps, trim tabs, etc.) and structural elements (doors, covers, etc.). In general, the sensors and transducers supply a differential AC signal. That is, the signal supplied by the sensors and transducers is not referenced to the system common potential ("ground"). Since the sensors (and wiring that interconnects the sensors with other system components) often are located in an area of relatively high electromagnetic noise, the common practice is to process the signal supplied by the sensor with differential input signal conditioning circuitry that exhibits a relatively high common mode rejection ratio (CMRR). For example, one type of signal conditioning arrangement that has been used with aircraft inductive position sensors employs a differential amplifier, two filter circuits, a synchronous demodulator, and a buffer amplifier. In this prior art arrangement, the differential AC signal supplied by the inductive position sensor is coupled to the input terminals of the differential amplifier via one of the filter circuits. The synchronous demodulator processes the single-ended signal produced by the differential amplifier. To provide synchronous operation, the demodulator is triggered by a clock signal that is derived from the position sensor excitation signal. To provide a DC signal representative of the differential AC position sensor signal, the output of the demodulator is low pass filtered and coupled to the aircraft system employing the sensor signal via a buffer amplifier.

The above-discussed type of circuit arrangement for processing signals provided by aircraft inductive position sensors (and other circuit arrangements for synchronous demodulation and rectification of an AC differential signal) exhibits certain disadvantages and drawbacks. For example, such a circuit exhibits a relatively high parts count; has relatively high operating power requirements; and occupies a relatively large surface area. Because of the relatively high parts count, a prior art signal conditioning arrangements of the above-described type often exhibits higher cost than is desired. Moreover, because of the high parts count and other factors, high reliability and high levels of performance are not easily attained.

It will be recognized by those skilled in the art that concurrent achievement of relative high reliability, high levels of performance, relatively simple circuit topology, small size and low cost is subject to conflicting design constraints. For example, although use of precision components can result in increased circuit performance, cost of the circuitry increases. Custom designed integrated circuits can be employed to improve performance with attendant decrease in parts count and circuit surface area (and overall size). However, use of custom designed integrated circuits generally increases cost. In some cases, attempts have been made to consolidate the functions performed by various circuit stages of the prior art arrangements into a lesser number of stages or modules to thereby obtain reduced part count, a decrease in cost, a decrease in circuit surface area and increased reliability. However, consolidating signal conditioning functions to obtain simpler circuit topology (or, alternatively, eliminating functions such as filtering) typically causes a decrease in circuit performance. For these reasons and others, a need exists for arrangements that better satisfy the many constraints and considerations attendant to high performance synchronous rectification of differential AC signals.

SUMMARY OF THE INVENTION

This invention provides circuitry for synchronously converting a AC differential signal to a DC signal that is representative of the amplitude of the AC signal. Although amenable to use in numerous applications, the invention is specially suited for use as circuitry for conditioning differential AC signals provided by inductive position sensors that operate in aircraft electrical and electronic systems (or other environments) in which it is necessary or desirable that the circuitry operate at relatively low power levels and exhibit high reliability (low failure rate), high level performance (low error levels), small size and low cost.

Basically, the invention comprises a pair of switched circuit arrangements that function as "charge pumps." Each of the charge pumps is repetitively switched by an applied clock signal between a first state in which the charge pump senses the amplitude of an applied signal and a second state in which charge (current) is delivered that is proportional to the amplitude of the previously sensed input signal. To provide a DC output signal that is representative of an applied AC differential signal, the disclosed arrangement of the invention includes two capacitors, which are connected in series with one another between system common potential (ground) and the input terminal of a buffer amplifier. In this arrangement, the output terminals of the first charge pump are connected to the terminals of one of the capacitors and the output terminals of the second charge pump are connected to the terminals of the second capacitor. In addition, the AC differential signal being processed is supplied to input of the second charge pump with a 180° phase shift (i.e., the input polarity of the second charge pump is reversed relative to the input polarity of the first charge pump). To achieve synchronous operation, the pulse repetition frequency of the charge pump clock signal is synchronized to the applied differential AC signal. However, the clock signal supplied to the second charge pump is inverted (or other provision is made) so that the first and second charge pumps operate in alternation with one another relative to sensing the amplitude of the applied AC differential signal and supplying charge to their respective output capacitors. That is, during a period of time in which the clock signal is in a first state (e.g., "high"), the first charge pump senses the amplitude of the applied AC differential signal and the second charge pump supplies an amount of electrical charge to its output capacitor that represents the amplitude of the applied differential signal during the previous one-half signal of the clock signal. Because the clock signal is synchronous with the applied AC signal, the charge supplied is representative of the average amplitude of the next most antecedent half cycle of the applied AC differential signal. In a similar manner, the second charge pump senses the amplitude of the applied AC differential signal when the clock signal is in a second state (e.g., "low") and the first charge pump supplies charge to its associated output capacitor.

Because of the synchronous operation of the charge pumps and the 180° phase difference between the charge pump input signals, additive voltages are developed across the two series-connected output capacitors. That is, although the two charge pumps operate in synchronized alternation to respectively sense positive and negative half cycles of the applied differential AC signal, connection of the charge pumps with the input signals 180° out of phase causes the charge pump output capacitors to be charged with like polarity. This means that the signal provide to the buffer amplifier (and, hence, by the invention) can exceed the amplitude of an applied AC signal.

In a disclosed arrangement for signal conditioning of an AC differential signal provided by an inductive position sensor, the output of the position sensor is connected for supplying oppositely phased signals to the first and second charge pumps. Alternatively, the charge pump output terminals are connected to charge the output capacitors with like polarity. The output of the position sensor also is connected to a clock signal generator which supplies clock signals to the first and second charge pumps. Driver and inverter amplifiers are connected to the output of the clock signal generator (or are included in the generator) for supplying a switch control signal that switches the charge pumps in alternation with one another between the above-discussed signal sensing and charge delivery (injection) states. A buffer amplifier is connected for receiving the signal generated across the charge pump output capacitors, thereby isolating the signal conditioning circuit from the system or component that utilizes the DC signal that is generated by the circuitry.

In the currently preferred embodiments of the invention, the first and second charge pumps are identical switched capacitor circuit arrangements in which analog electronic switches are used to alternately and synchronously switch a capacitor so that it is charged by one-half cycle of an applied AC differential signal (e.g., the output signal of a position sensor); and, during the other one-half cycle of the applied signal, is connected to inject charge into (share charge with) one of the charge pump output capacitor. In this currently preferred embodiment, resistors are included in the signal path that couples the AC differential signal to the switched capacitor circuits. These input resistors establish an RC time constant that allows the signal conditioning circuit to track amplitude changes in the signals supplied by the position sensor while simultaneously maintaining a relatively high input impedance. On the other hand, the RC time constant of the output circuit is relatively short, being determined entirely (or at least primarily) by the "on" resistance of the electronic switches that periodically interconnect the switched capacitors with the charge pump output capacitors.

The above-discussed embodiments of the invention provide a high level of performance (low error level), high reliability, low cost and small size. A high level of common mode rejection is provided. Further, since the circuitry is synchronized at a frequency that is identical to the frequency of the applied AC differential signal, the circuit exhibits a relatively high degree of noise rejection (i.e., signals above and below the above clock pulse repetition frequency produce little or no DC output signal).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
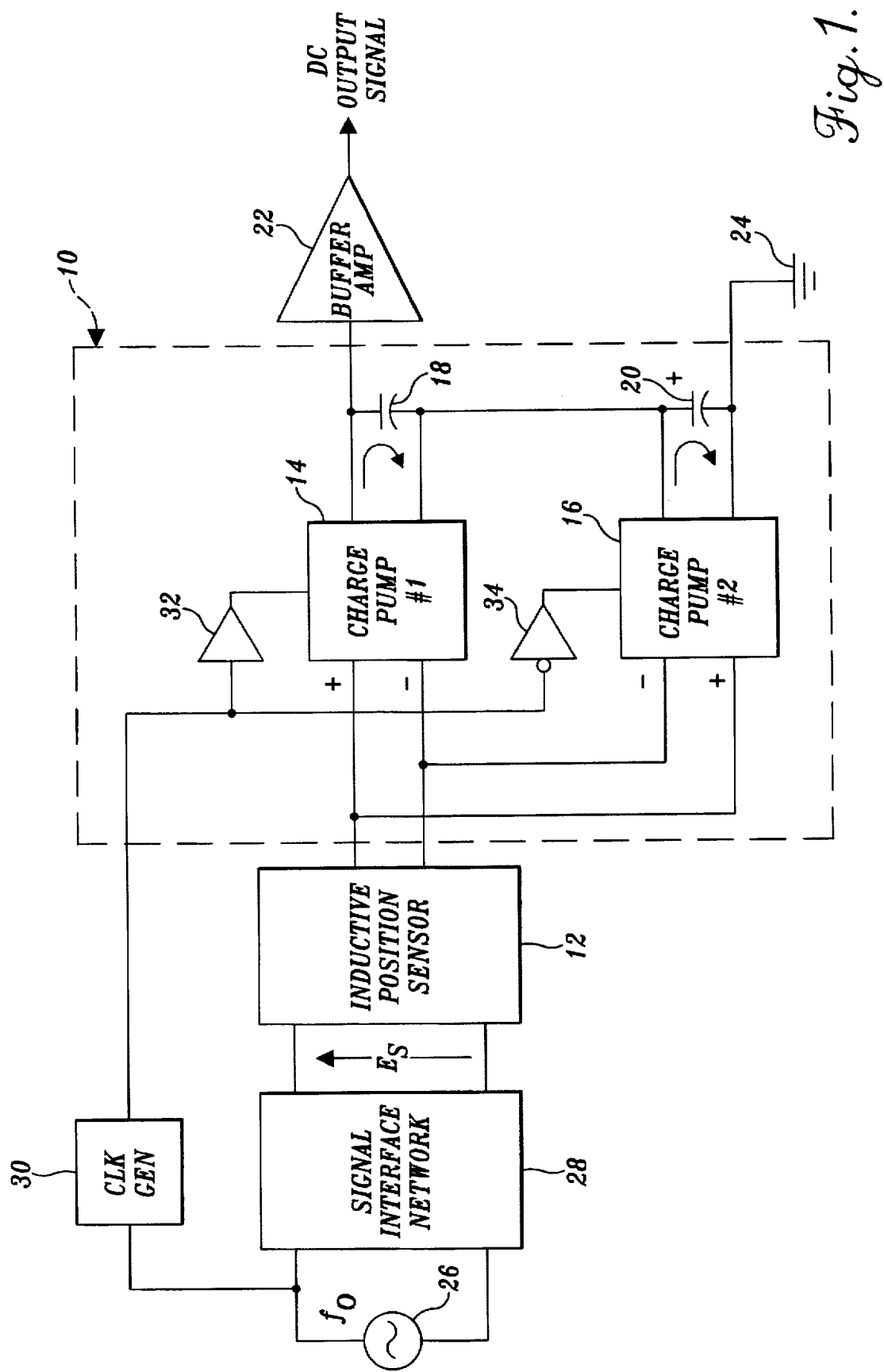
FIG. 1 is a block diagram that illustrates the invention arranged for signal conditioning (AC to DC conversion) of a differential AC signal that is provided by an inductive position sensor.

The arrangement shown in FIG. 1 illustrates the invention embodied for operation with an inductive position sensor such as a linear variable differential transformer (LVDT) or inductive proximity sensor. In the depicted arrangement, synchronous AC to DC conversion of the AC differential signal supplied by an inductive position sensor 12 is provided by first and second charge pump units (14 and 16), which are included within a dashed outline 10. The input terminals of charge pump 14 and charge pump 16 are connected for receiving the differential signal supplied by position sensor 12, with the two charge pump units being connected for receiving signals of opposite phase. Output capacitors 18 and 20 are respectively connected between the output terminals of charge pump 14 and charge pump 16, with capacitors 18 and 20 also being connected in series with one another between the input terminal of a buffer amplifier 22 and the system ground or common potential 24. As shall be recognized upon understanding the operation of the invention, buffer amplifier 22 supplies a signal representative of the amplitude of the differential AC signal produced by inductive position sensor 12.

In the arrangement of FIG. 1, an AC excitation signal is supplied to inductive position sensor 12 by an AC signal source 26 via a signal interface network 28. In this arrangement, AC signal source 26 supplies a sinusoidal signal at a predetermined frequency, $f_0$. Signal interface network 28 couples the excitation signal to inductive position sensor 12 at a constant amplitude. Thus, collectively, AC signal source 26 and signal interface network 28 form an amplitude and frequency stable AC signal source. As is known in the art, the output signal supplied by inductive position sensor 12 is an AC signal at frequency $f_0$, with the amplitude of the signal being representative of the spatial relationship between the sensor and a "target" object. That is, the amplitude of the AC differential signal provided by inductive position sensor 12 in effect is modulated in accordance with changes in position of a monitored object such as an aircraft flap, trim tab, door, cover panel or other control surface or structural element. For example, with respect to typical proximity sensors, the AC excitation signal is supplied to an inductor that is mounted so that a change in position of the item being monitored alters the electromagnetic characteristics, and hence the output signal, of the proximity sensor. As also is known in the art, linear variable differential transformers (LVDT's) include a movable core element that varies the electromagnetic coupling between the primary and secondary windings so that the output signal indicates the displacement of the movable core and, hence, the position of an object that is attached to the core.

To allow synchronous conversion of the signal provided by inductive position sensor 12, the arrangement of FIG. 1 includes a clock generator 30. Clock generator 30 is a conventional circuit arrangement that converts the AC position sensor excitation signal to a periodic rectangular waveform (clock signal) that has a pulse repetition frequency identical to the frequency of the position sensor excitation signal. Although clock generator 30 of FIG. 1 is shown with its input connected to AC signal source 26, a suitable clock signal also can be derived from the output of signal interface network 28 or from the input of inductive position sensor 12. If necessary, clock generator 30 can include a phase shifting network (or an external network can be provided) so that the rectangular clock signal is in phase with the signal supplied by inductive position sensor 12.

In the arrangement of FIG. 1, charge pumps 14 and 16 are identical in function, each exhibiting a signal sensing state in which the charge pump senses the amplitude of the signal supplied to the charge pump input terminals and a charge transfer or injection state in which charge is transferred from the charge pump 14 or 16 to the respective output capacitors 18 and 20. Further, the clock signal supplied by clock generator 30 is coupled to first charge pump 14 via a driver amplifier 32 and is coupled to second charge pump 16 via an inverting driver amplifier 34. Thus, charge pumps 14 and 16 are switched between the sensing state and the charge injection state in alternation with one another to sense the signal supplied by inductive position sensor 12 during alternate half cycles of the position sensor output signal. That is, during each half cycle in which charge pump 14 is sensing the signal supplied by inductive position sensor 12, charge pump 16 is sharing charge (representative of the amplitude of the position sensor output signal during the next most antecedent half cycle) with its output capacitor 20. Conversely, during each half cycle in which charge pump 16 is sensing the amplitude of the signal supplied by position sensor 12, charge pump 14 is sharing charge with (i.e., injecting charge into), associated output capacitor 18, with the amount of charge being representative of the amplitude of the output signal of position sensor 12 during the next most antecedent one-half cycle of the position sensor output signal.

As previously mentioned, the inductive position sensor output signal supplied to charge pumps 14 and 16 are of opposite polarity, i.e., the signals are 180° out of phase with one another. In view of the above-described manner in which charge pumps 14 and 16 switch between the sensing state and the charge injection state, it can be recognized that a phase stable inductive position sensor output signal causes capacitors 18 and 20 to be charged so that the voltage developed across the capacitors is additive. That is, in an arrangement in which charge pump 14 causes charge (current) to flow into capacitor 18 in the direction shown by the arrow in FIG. 1 in response to previous sensing of a positive half cycle of position sensor output signal, charge pump 16 will cause charge (current) to flow through output capacitor 20 in the same direction (shown by the arrow in FIG. 1) in response to previous sensing of a negative half cycle of the inductive position sensor output signal. This and other aspects of the operation of the invention will be described in more detail relative to FIG. 3 in view of both the block diagram of FIG. 1 and FIG. 2, which schematically illustrates one realization of charge pumps 14 and 16.

Although various arrangements can be used to realize charge pumps 14 and 16, the currently preferred embodiments of the invention employ switched capacitor circuits in which each charge pump includes a capacitor that is synchronously switched between a circuit path in which the capacitor is charged by the applied AC differential signal and a different circuit path in which the capacitor shares charge with the charge pump output capacitor. For example, when switched capacitor circuits are used in the inductive position sensor signal conditioning arrangement of FIG. 1, each charge pump 14 and 16 includes a capacitor that is switched so that it is charged by the inductive position sensor output signal during alternate half cycles of the position sensor output signal and, during intervening half cycles, shares the accumulated charge with the respective output capacitor (18 or 20).

Figure 2:
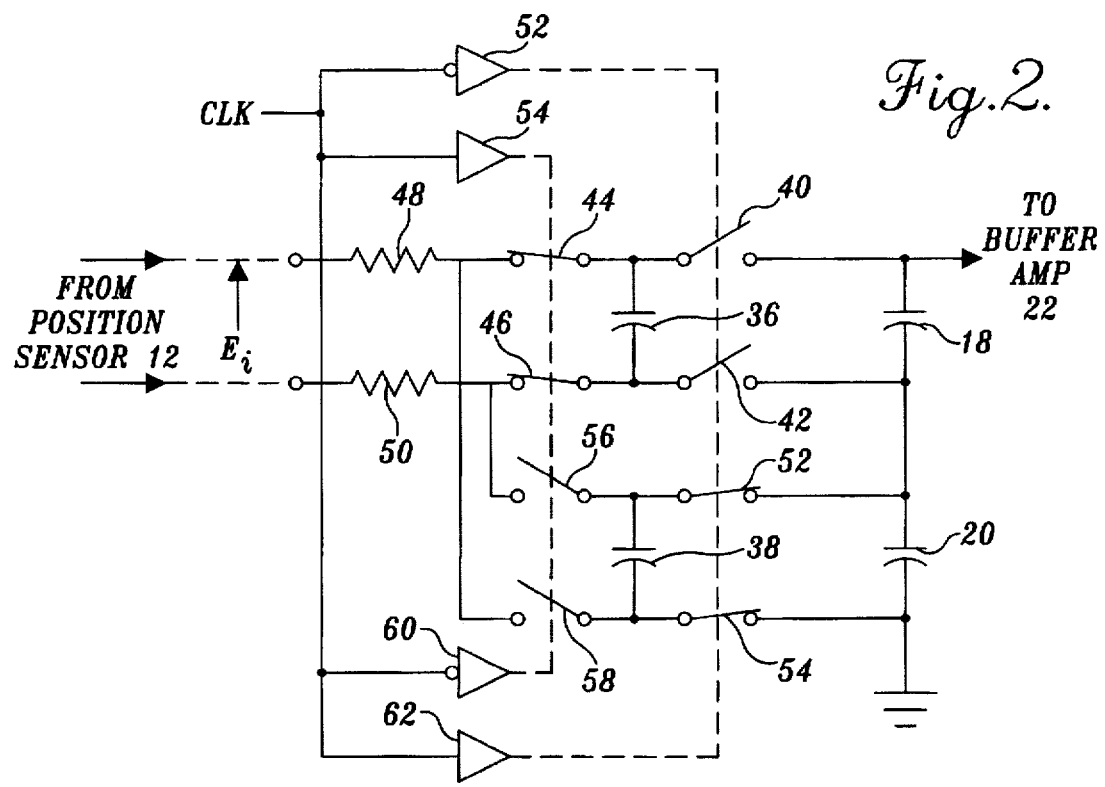
FIG. 2 schematically depicts a switched capacitor circuit that can be employed as charge pump units in the arrangement of FIG. 1.

The currently preferred realization of such a switched capacitance arrangement is schematically shown in FIG. 2, in which a capacitor 36 and associated switches perform the function described relative to charge pump 14 of FIG. 1 and a capacitor 38 and associated switches perform the function attributed to charge pump 16 of FIG. 1. More specifically, in FIG. 2, a pair of switches 40 and 42 are operable for connecting capacitor 36 directly across output capacitor 18 (i.e., form a current loop with capacitor 18) and a pair of switches 44 and 46 are operable for connecting capacitor 36 so that it is not in a circuit path that includes capacitor 18, but is connected to be charged by the signal supplied by inductive position sensor (12 of FIG. 1) via two resistors 48 and 50. As is indicated in FIG. 2, switch pair 40–42 is open when switch pair 44–46 is closed, thereby allowing capacitor 36 to be switched between a sensing state in which it receives the signal supplied by the position sensor and a charge injection state in which it supplies charge to (shares its stored charge with) output capacitor 18.

In the arrangement of FIG. 2, switch pair 44–46 is activated by the clock signal (e.g., the signal provided by clock generator 30 of FIG. 1) via a noninverting amplifier 52. On the other hand, the clock signal activates switch pair 40–42 via an inverting amplifier 54. Thus, for example, in an arrangement in which switch pair 44–46 is activated when the clock signal is high and the clock signal is in phase with the inductive position sensor output signal, capacitor 36 will be charged during positive half cycles of the position sensor output signal and capacitor 36 will share charge with output capacitor 18 during negative half cycles of the inductive position sensor output signal.

The interconnection and switching of capacitor 38 is similar to the interconnection with and switching of capacitor 36. In particular, a switch pair 52–54 is selectively operable to connect capacitor 38 with output capacitor 20 so that current (charge) flowing from capacitor 38 flows into output capacitor 20 and a switch pair 56–58 is selectively operable so that capacitor 38 is disconnected from output capacitor 20 and is charged by the inductive position sensor signal via resisters 48 and 50. As is indicated by noninverting amplifier 62 of FIG. 2, switch pair 52–54 interconnects capacitor 38 and output capacitor 20 during half cycles of position sensor output signal in which capacitor 36 is being charged by the position sensor signal. Similarly, as is indicated by inverting amplifier 60 of FIG. 2, capacitor 38 is charged by the position sensor output signal during half cycles in which capacitor 36 is sharing charge with output capacitor 18. Thus, the arrangement of FIG. 2 operates in alternation in two respects. First, each switched capacitor 36 and 38 synchronously alternates between the previously discussed sensing and charge injection states. Second, whenever capacitor 36 is switched to the sensing state, capacitor 38 is switched to the charge injection state, i.e., capacitors 36 are connected so they are concurrently in the alternate states of sensing and charge injection. It also can be noted that switch pair 44–46 and switch pair 56–58 are connected for reverse-phase operation, i.e., switch pair 56–58 is connected so that the position sensor output signal supplied to switch pair 56–58 is 180° out of phase with the sensor signal that is supplied to switch pair 44–46. As was described relative to FIG. 1, the synchronous operation of the invention and the attendant phase reversal causes output capacitors 18 and 20 to be charged with like polarity. That is, in the previously mentioned example in which capacitor 36 is charged during positive half cycles of position sensor output signal, output capacitors 18 and 20 are charged so that a positive voltage is supplied to buffer amplifier 22 of FIG. 1, with each output capacitor 18 and 20 contributing approximately one-half of the supplied voltage.

Although the above-discussed switch pairs 40–42, 44–46, 52–54, and 56–58 are represented in FIG. 2 by generic switch symbols, the invention usually employs solid state switching devices such as field effect transistors. In that regard, the currently preferred embodiments of the invention utilize an integrated circuit arrangement that includes a plurality of analog solid state switches. For example, one such device, manufactured by Linear Technology Corporation and identified as device No. LTC1043, includes four metal oxide (insulated gate) field effect transistor switching circuits that are driven between "ON" and "OFF" states by an applied switching signal, such as the switch control signal described relative to FIGS. 1 and 2.

Figure 3A:
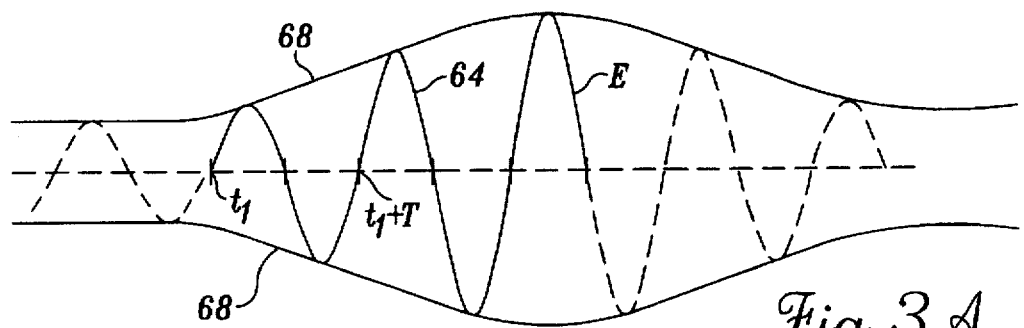
FIGS. 3A–3G are signal diagrams that are useful in understanding operation of the arrangement of FIG. 1 during a period of time in which the amplitude of the applied AC differential signal increases as a function of time.
Figure 3B:
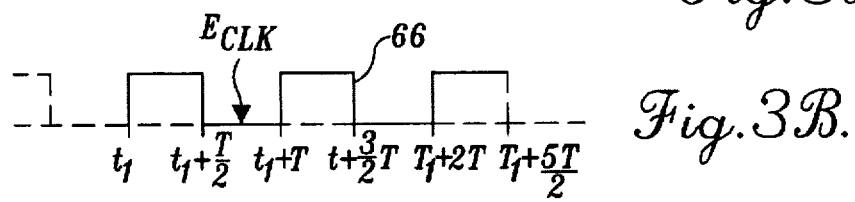

The operation of the arrangement shown in FIGS. 1 and 2 can be understood in greater detail with reference to the signal diagrams of FIGS. 3A–3G. In FIGS. 3A–3G, the position sensor output signal is indicated by reference numeral 64 (FIG. 3A) and the clock signal is represented by reference numeral 66 (FIG. 3B). In the exemplary situation depicted in FIG. 3A, position sensor output signal 64 is constant for time less than time $t_1$, i.e., there is no change in position of the sensed object. As is indicated by envelope outlines 68 in FIG. 3A, following time $t_1$, the amplitude of position sensor output signal 64 smoothly increases for slightly more than two periods, T, of sensor output signal 64 and then decreases. As was described relative to FIGS. 1 and 2, the clock signal 66 (FIG. 3B) is derived from the position sensor output signal 64 (FIG. 3A), and is in phase with position sensor output signal 64.

The amplitude of position sensor output signal 64 is constant prior to time $t_1$ in FIG. 3A. Thus, at time less than $t_1$, it can be recognized that the DC signal supplied to buffer amplifier 22 (signal $E_{out}$ in FIG. 3G) is a constant value ($E_o$, in FIG. 3G), with one-half the DC signal ($E_o/2$) being provided by output capacitor 18 (signal $E_{C18}$ in FIG. 3E) and the remaining one-half being supplied by output capacitor 20 (signal $E_{C20}$, FIG. 3F).

During the first one-half cycle in which the amplitude of position sensor output signal 64 increases (time $t_1$ to $t_1+T/2$), clock signal 66 of FIG. 3B is high, which in the previously discussed arrangement of FIG. 1 causes charge pump 16 to sense the inductive position output signal and causes charge pump 16 to inject charge into output capacitor 20. With respect to operation of the arrangement shown in FIG. 2, it can be recognized that capacitor 36 charges during time period $t_1$ to $t+T/2$, with the voltage across capacitor 36 (waveform $E_{C36}$ in FIG. 3C increasing from an initial voltage, $E_i$, to a more positive voltage $E_{r1}$). As can be recognized in view of FIG. 2, the time constant for charging of capacitor 36 is $RC_{36}$ where R represents the sum of the resistance values of resistors 48 and 50 in FIG. 2 and the capacitance value of capacitor 36 is $C_{36}$. In the practice of the invention, component values for resistors 48 and 50 and capacitors 36 and 38 are selected to maintain a relatively high input impedance while also providing a time constant short enough to ensure that the DC output signal supplied to buffer amplifier 22 adequately tracks amplitude changes in the signal provided by inductive position sensor 12. Although it is not necessary for robust and reliable operation, a balanced circuit configuration can be maintained by use of equal valued resistors for resistors 48 and 50. However, it can be recognized that a balanced configuration often is advantageous from the standpoint of protecting circuitry such as field effect transistor arrangements that are used to realize switches 36 and 38 from voltage transients such as emi-induced voltage spikes.

Figure 3C:
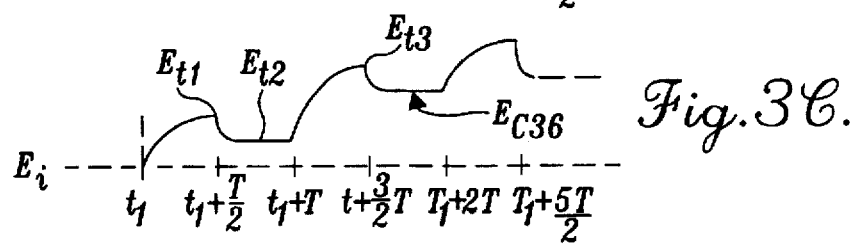
Figure 3D:
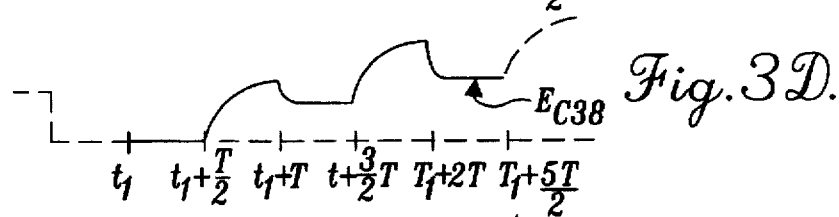
Figure 3E:
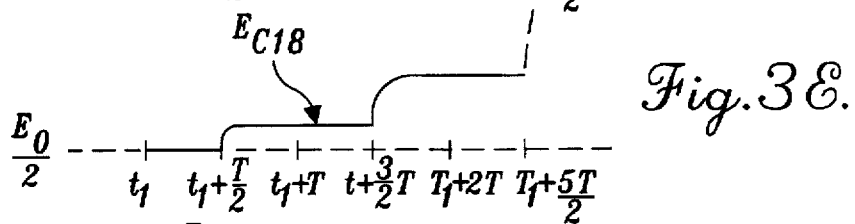
Figure 3F:
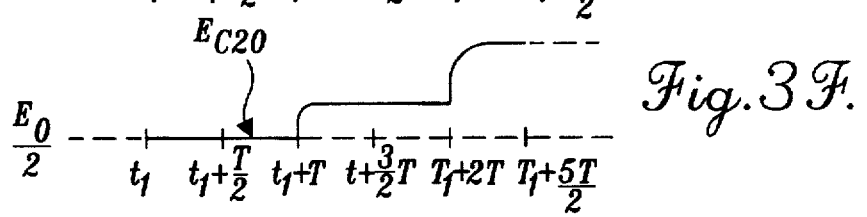
Figure 3G:
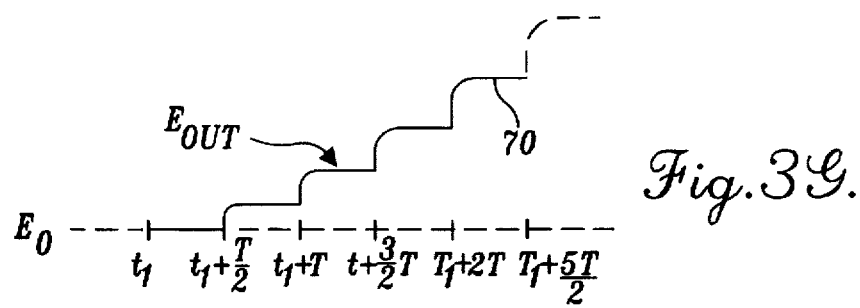

During time interval between time t and time $t_1+T/2$, charge pump 16 of FIG. 1 is connected for injecting charge into output capacitor 20. In terms of the arrangement shown in FIG. 2, this corresponds to capacitor 38 being connected directly across output capacitor 20 via switch pair 52–54. For the example under consideration, the amplitude of position sensor output signal 64 is constant for time t less than $t_1$. Thus, the voltage developed across capacitor 38 ($E_{C38}$) remains constant during time interval $t_1$ to $t_1+T/2$ (shown in FIG. 3D) and there is no change in the DC signal level ($E_o/2$) across capacitors 18 and 20 (FIG. 3E and F, respectively. Accordingly, as is indicated in FIG. 3G, the DC signal level supplied to buffer amplifier 22 remains at $E_o$ throughout time interval $t_1$ to $t_1+T/2$.

When clock signal 66 goes low at time $t_1+T/2$, charge pumps 14 and 16 of FIG. 1 change states so that charge pump 14 injects charge into its associated output capacitor 18 and charge pump 16 senses the amplitude of the signal being supplied by position sensor 12. With respect to the arrangement of FIG. 2, this causes capacitor 36 to share charge with output capacitor 18 and causes capacitor 38 to be charged by position sensor output signal 64. Thus, as indicated in FIG. 3C, the voltage across capacitor 36 decreases until charge equilibrium between capacitors 18 and 36 is reached (voltage level $E_{t2}$ in FIG. 3C). As will be recognized by those skilled in the art, the time constant associated with reaching charge equilibrium (i.e., charging of output capacitor 18) is determined by the capacitance values of capacitors 18 and 36 and the resistance of the circuit. Although FIG. 2 does not illustrate a discrete resistance, electronic analog switches of the previously mentioned type typically exhibit "ON" resistances on the order of a few hundred ohms. Since it generally is desirable to rapidly transfer charge between capacitor 36 and output capacitor 18, inclusion of additional resistance normally is not necessary.

At time $t_1+T$ in FIG. 3, clock signal 66 goes high, switching charge pump 14 into the state in which it is connected for receiving the signal supplied by position sensor 12 and, concomitantly, switching charge pump 16 to the state in which it shares charge with its associated output capacitor 20. In the example shown in FIG. 3, the peak amplitude of the signal supplied by position sensor 12 (signal 64 in FIG. 3A) during the one-half cycle that occurs between times $t_1+T$ and time $t_1+3T/2$ is greater than the peak amplitude during the previously discussed time interval $t_1+T/2$. Thus, as is indicated in FIG. 3C, capacitor 36 charges to a more positive voltage, $E_{t3}$, which is representative of the average amplitude of the signal supplied by position sensor 12 during the time interval $t_1+T$ to $t_1+3T/2$. Viewed in a somewhat different manner, the voltage change across capacitor 36 ($E_{t3}-E_{t1}$) is representative of the difference in the amplitude of the position sensor signal during time intervals $t_1$ to $t_1+T/2$ and $t_1+T$ to $t_1+3T/2$.

The functioning of charge pump 16 during time interval $t_1+T$ to $t_1+3T/2$ is similar to operation of charge pump 14 during time interval $t_1+T/2$ to $t_1+T$. That is, since the magnitude of the negative half cycle signal supplied by position sensor 12 during time interval $t_1+T/2$ to $t_1+T$ is greater than the magnitude of the previous negative half cycle (i.e., the negative half cycle that precedes time $t_1$), capacitor 38 of FIG. 2 is charged to a voltage that is greater than the voltage across capacitor 20. Thus, current flows into capacitor 20 until charge equalization occurs, thereby decreasing the voltage across capacitor 38 ($E_{C38}$ in FIG. 3D) and increasing the voltage across capacitor 20 ($E_{C20}$, FIG. 3F). The change in voltage across capacitor 20 results in an equal increase in the voltage supplied to buffer amplifier 22 ($E_{OUT}$ in FIG. 3G).

As is indicated in FIG. 3, the above-described operation continues throughout the period of time at which the amplitude of the differential AC signal supplied by position sensor 12 continues to increase. As is indicated in FIG. 3G, the result is an output signal that increases in a stair-step like manner at time intervals equal to one-half the period of the differential AC signal supplied by position sensor 12. Although not specifically shown in FIG. 3, it should be recognized that the invention operates in a similar manner during periods of time in which the amplitude of the signal supplied by position sensor 12 decreases.

In most situations, it is not necessary to low pass filter the signal supplied by the invention. Specifically, for purposes of clarity, the frequency of the position sensor output signal shown in FIG. 3A is relatively low (as compared to the depicted rate of change in amplitude of that signal). In actual practice, the frequency of the position sensor excitation signal (and hence the frequency of the position sensor output signal) is relatively high, as compared with the output signal's rate of change in amplitude. The result is a DC signal that varies more smoothly than the signal shown in FIG. 3G, with the amplitude of the signal being representative of the amplitude of the AC differential signal supplied by a position sensor.

The arrangements of the invention shown in FIGS. 1 and 2 achieve a high common mode rejection ratio (CMRR) because the charge supplied to the switched capacitors (C36 and C38 in FIG. 2) is determined by the change in signal amplitude that occurs during one cycle of position sensor output signal. For example, as previously noted, the voltage change (and, hence, amount of change in charge) for capacitor C36 in FIG. 3 during the time interval between times $t_1+T$ and $t_1+3T/2$ is determined by the difference in the amplitude of the position sensor signal during time intervals $t_1$ to $t_1+T$ to $3T/2$.

Figure 4A:
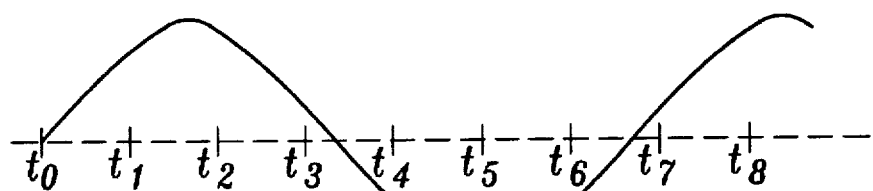
FIGS. 4A–4E are signal diagrams exemplifying the manner in which the invention operates to achieve noise rejection at frequencies that are lower than the pulse repetition frequency of the applied clock signal.
Figure 4B:
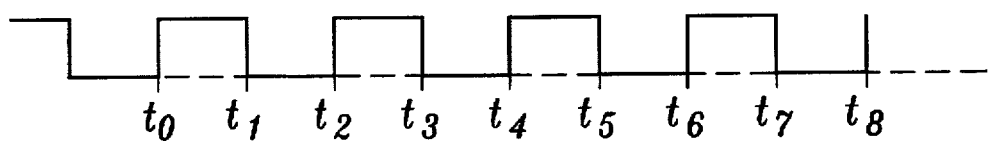

In addition to the above-described features, the invention offers advantages from the standpoint of differential noise signals at frequencies above and below the frequency of the applied position sensor signal. With respect to rejection of low frequency differential noise signals, FIG. 4 illustrates an example in which the period of the system clock signal (and hence, the signal supplied by the system inductive position sensor) is 0.3 times the period of a differential noise signal (shown in FIG. 4A). Since the clock signal controls the operational state of charge pumps 14 and 16 in FIG. 1 and capacitors 36 and 38 in FIG. 2, it can be recognized that each complete cycle of the depicted noise signal corresponds to six and two-thirds clock cycles and, hence, six and two-thirds time intervals in which the arrangements of FIGS. 1 and 2 alternately sense the noise signal of FIG. 4A and supply electrical charge representative of the amplitude of the noise signal. In the particular example shown in FIG. 3, the clock signal of FIG. 4B goes high coincident with a positive going zero crossing of the noise signal shown in FIG. 4A. Thus, the first cycle of the noise signal includes three and two-thirds time intervals in which the clock signal is high and three time intervals in which the clock signal is low. More specifically, under the stated conditions, the positive half cycle of the noise signal will correspond to two time intervals in which charge pump 14 of FIG. 1 (capacitor 36 of FIG. 2) is connected for receiving the differential noise signal, i.e., time intervals $t_0$ to $t_1$ and $t_2$ to $t_3$ in FIG. 4B. Also included in the positive half cycle of the differential noise signal shown in FIG. 4A are one and one-third time intervals in which charge pump 14 (capacitor 36 in FIG. 2) is supplying charge to its associated output capacitor 18. Moreover, as previously described, during time periods in which charge pump 14 (capacitor 36) is being charged by an applied signal such as noise signal FIG. 4A, charge pump 16 (capacitor 38 of FIG. 2) is sharing charge with the associated output capacitor 20. Similarly, when capacitor 36 is connected for sharing charge with its associated output capacitor 18, capacitor 38 (charge pump 16, FIG. 1) is charged by the system input signal (including any differential noise signal such as the signal shown in FIG. 4A).

Since the signal supplied to charge pumps 14 and 16 are 180° out of phase with one another, a positive going signal that causes charge pump 14 (capacitor 36 in FIG. 2) to supply additional charge to output capacitor 18 will result in charge pump 16 (capacitor 38) receiving charge from output capacitor 20. That is, if a positive going input signal causes one of the charge pumps to increase the voltage supplied to buffer amplifier 22, it will cause the other charge pump to decrease the signal. With the invention arranged as described relative to FIGS. 1 and 2, sensing of the positive going portion of the noise signal of FIG. 4A by charge pump 14 (FIG. 1) and capacitor 36 (FIG. 2) (during time intervals $t_0$ to $t_1$ and $t_2$ to $t_3$) will result in additional charge being supplied to capacitor 18 which, in turn, causes the signal supplied to buffer amplifier 22 to become more positive. On the other hand, sensing of the positive going portions of the noise signal by charge pump 16 (during time interval $t_1$ to $t_2$) will result in charge being removed from capacitor 20 which, in turn, reduces the voltage supplied to buffer amplifier 22.

Figure 4C:
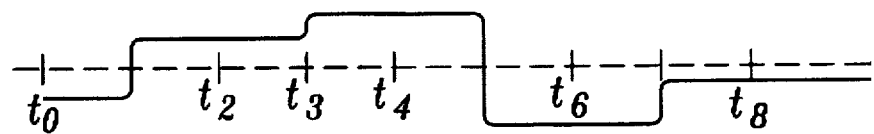
Figure 4D:
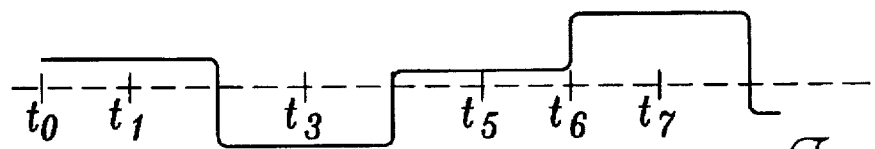
Figure 4E:
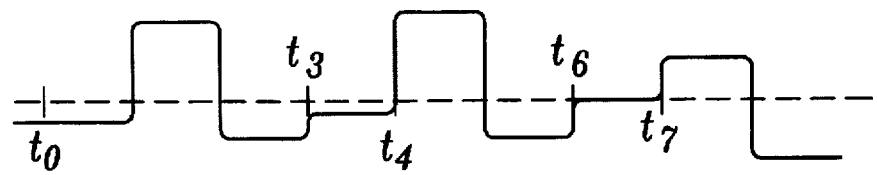
Figure 5A:
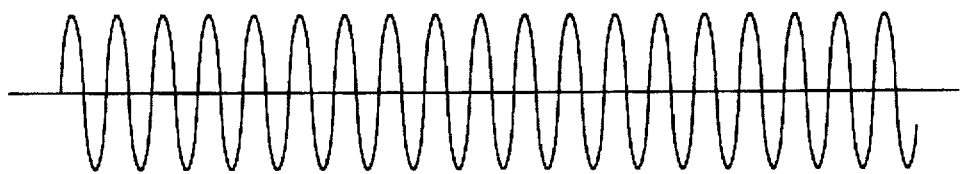
FIGS. 5A–5E are signal diagrams exemplifying the manner in which the invention operates to achieve noise rejection at frequencies greater than the pulse repetition frequency of the applied clock signal.
Figure 5B:
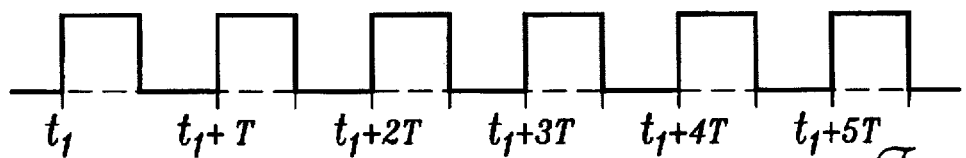
Figure 5C:
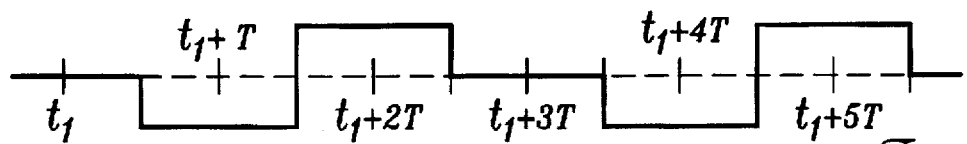
Figure 5D:
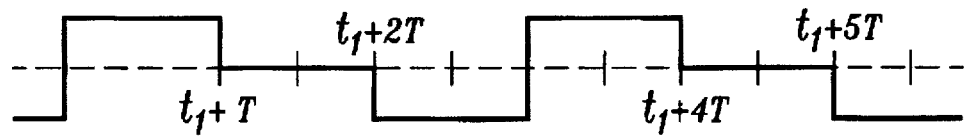
Figure 5E:
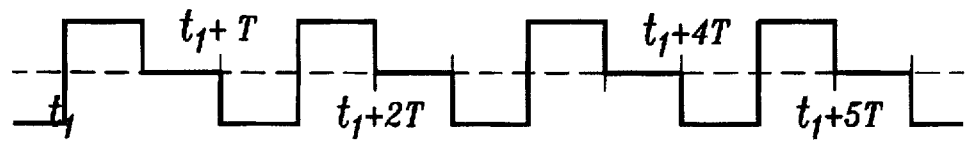
Figure 6:
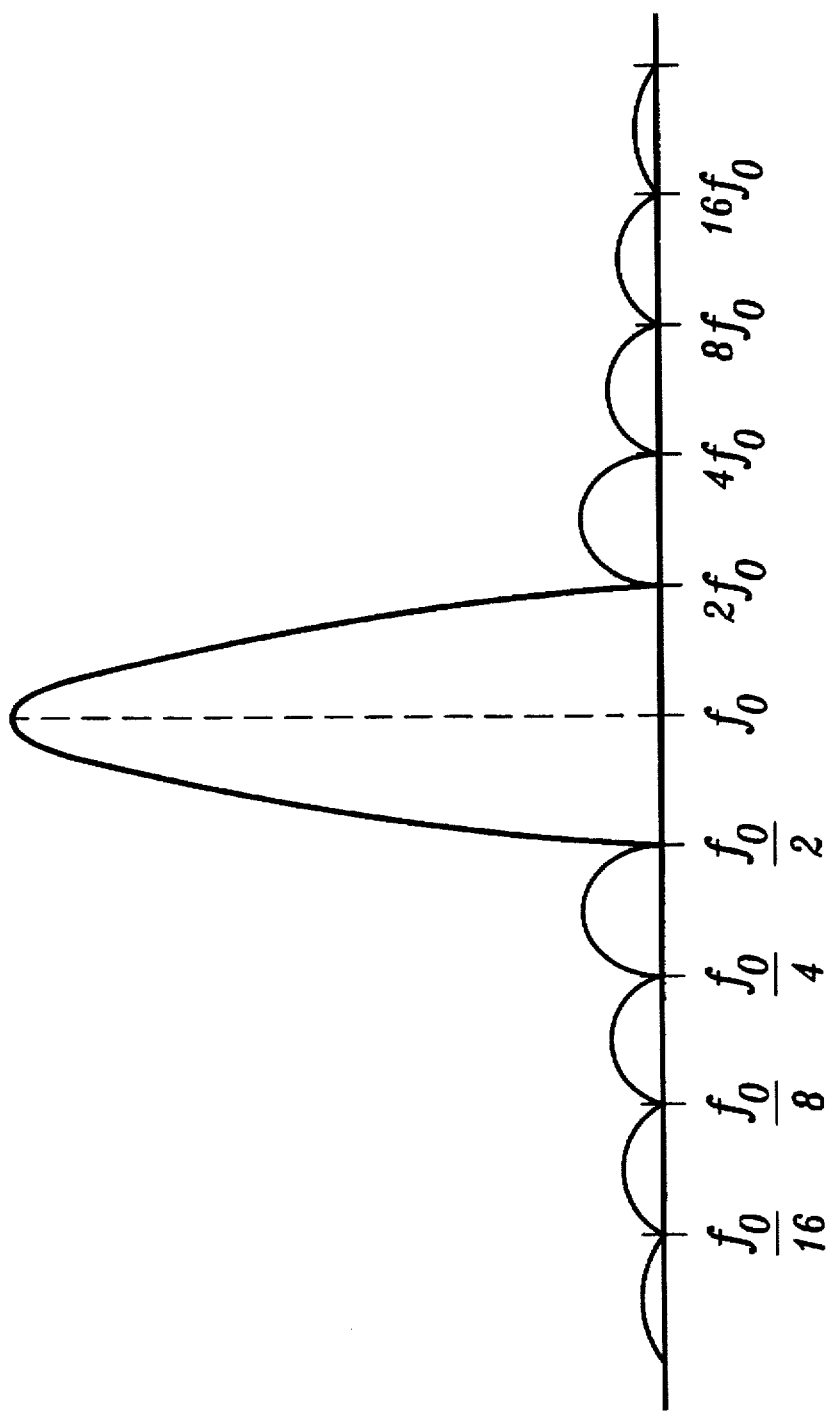
FIG. 6 diagrammatically depicts the output vs. frequency characteristics of the invention.

FIGS. 4C and 4D graphically depict the voltages developed across capacitors 18 and 20 for the noise signal shown in FIG. 4A. As discussed above as shown in FIG. 4C, sensing of the depicted noise signal by charge pump 14 (FIG. 1) and capacitor 36 (FIG. 2) during the positive half cycle causes an increase in the voltage developed across capacitor 36 at time $t_1$ and $t_3$. On the other hand, as is shown in FIG. 4D, sensing of the depicted positive half cycle of the noise signal by charge pump 16 (FIG. 1) and capacitor 38 (FIG. 2) causes in the voltage developed across capacitor 20 to decrease (go negative) at time $t_2$ and remains negative until time $t_4$. As is also indicated in FIGS. 4C and 4D, the depicted negative half cycle of the noise signal will cause the charge pump 14 to develop a negative voltage across capacitor 18 (time $t_5$ to $t_7$ in FIG. 4C) and will result in capacitor 20 being charged to a positive voltage during time interval $t_4$ to $t_5$ and a higher positive voltage during time interval $t_6$ to $t_8$. Because the circuit operates in this manner, substantial noise rejection is provided for noise signals at frequencies below the frequency of the system inductive position sensor. For example, as is indicated in FIG. 4E, the signal that results from the noise signal of FIG. 4A is of relatively low amplitude. With respect to the signal rejection ratio, and as is indicated in FIG. 6, it can be shown that the arrangement of the invention theoretically provides total rejection of low frequency noise at frequencies $f_o/2^n$, where $f_o$ represents the frequency of the inductive position sensor (i.e., the pulse repetition frequency of the clock signal) and n is a positive real integer. As also is indicated in FIG. 6, the amplitude of the depicted circuit transfer characteristic decreases with decreasing frequency.

The manner in which the invention operates to reject noise signals at frequencies higher than the system inductive position sensor is indicated by the waveforms shown in FIG. 5. In the depicted example, a differential noise signal (FIG. 5A) exhibits a period approximately equal to 0.3 times the period of the system inductive position sensor signal (and, hence, approximately 0.3 times the period of the system clock signal shown in FIG. 5B). Thus, each period of time in which a charge pump senses the differential noise signal of FIG. 5A (or shares charge with its associated output capacitor) corresponds to one and two-thirds cycles of the noise signal. As is shown in FIGS. 5C and 5D, this particular example results in non-symmetric, periodic voltages being developed across capacitor 18 (FIG. 5C) and capacitor 20 (FIG. 5D) with the phase difference (time delay) between the two signals being approximately equal to 1.5 times the period of the system clock signal (FIG. 5B). Because of this time delay and because the capacitors 18 and 20 are switched between negative and positive voltages, the signal supplied to buffer amplifier 22 (FIG. 5E) is of relatively low amplitude, thus providing a substantial degree of noise rejection. As is indicated in FIG. 6, it can be shown that the system theoretically provides total noise rejection at signal frequencies of $2^{-n}f_o$, where n is a positive integer and $f_o$ designates the frequency of the signal supplied by the system inductive position sensor. As also is indicated in FIG. 6, the maximum amplitude of each side band of the depicted transfer function decreases with increasing frequency.

Figure 7:
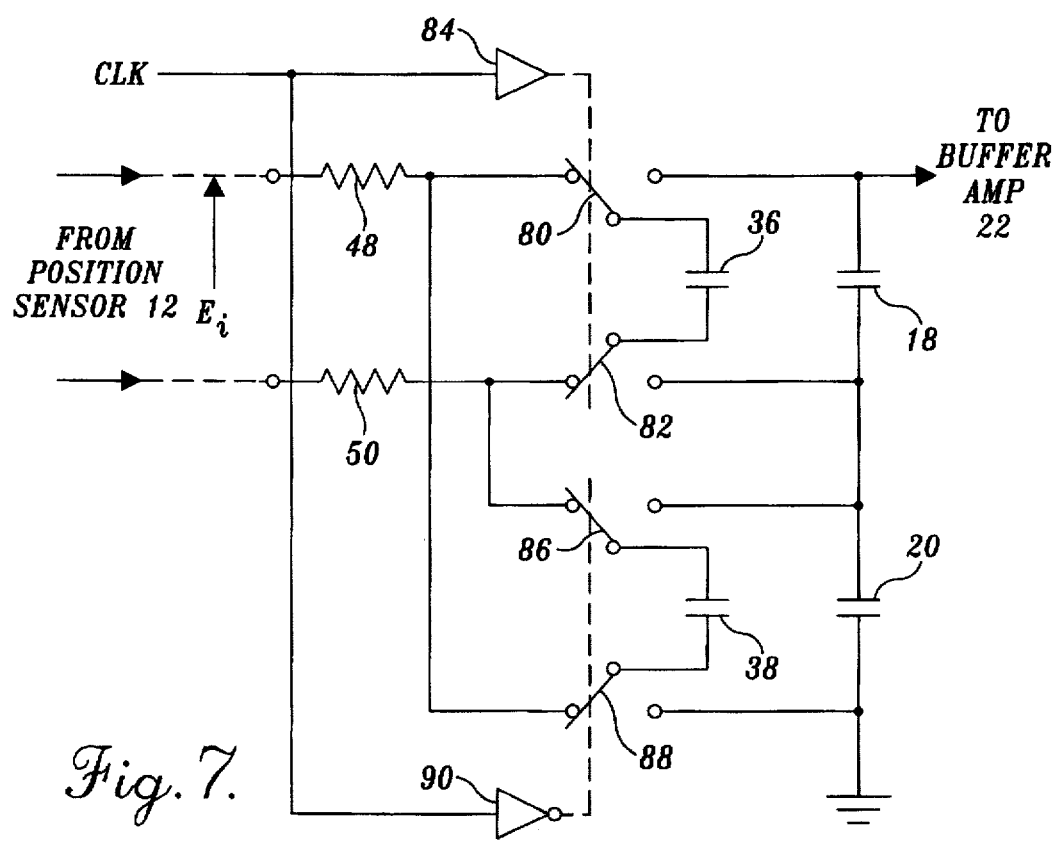
FIG. 7 schematically depicts an alternative switched capacitor circuit that can be used in place of the switched capacitor circuit that is shown in FIG. 2.

It will be recognized by those skilled in the art that various changes can be made without departing from the scope and the spirit of the invention. For example, FIG. 7 illustrates a circuit arrangement that functionally corresponds to the circuit arrangement of FIG. 2, but employs fewer switches and switch drivers. In FIG. 7, capacitors 36 and 38 are each switched between the above-discussed alternate states by two switches, rather than two pairs of switches. More specifically, capacitor 36 of FIG. 7 employs two switches 80 and 82, rather than the two switch pairs 40–42 and 44–46 shown in FIG. 2. Similarly, capacitor 38 of FIG. 7 is connected to two switches 86 and 88, rather than the two switch pairs 52–54 and 56–58 of FIG. 2. As also can be seen in FIG. 7, the depicted switching arrangement can be controlled by two switch drivers (amplifiers), rather than the four switch drivers shown in FIG. 2. That is, in the arrangement of FIG. 7, a non-inverting amplifier 84 is shown as the driver circuit for switches 80 and 82 and an inverting amplifier 90 is shown as the switch driver for switches 86 and 88.

As was mentioned relative to the arrangement of FIG. 2, the switches employed in the practice of the invention are electronic switches, such as circuits that employ field effect transistors. It should thus be recognized that there are numerous ways to embody the invention with the switch drivers described relative to FIGS. 2 and 7 either being separate, discrete circuits or being integrated with the switch circuits. In all cases, it is important to use electronic switches that exhibit a "break-before-make" characteristic. That is, output capacitors 18 and 20 should remain isolated from the signal supplied by the system position sensor (or other signal source) throughout the switching sequence.

It also should be recognized that application of the invention is not limited to an environment in which the signal supplied by an inductive position sensor is processed to obtain a DC signal representative of the amplitude of a position sensor (i.e., representative of the position being sensed). Various other situations exist in which a need exists for converting a differential AC signal to a DC signal that represents the amplitude of the AC signal. Moreover, the invention can be used in applications requiring the generation of a DC signal that is representative of relative phase shift of an AC signal and applications calling for generation of a DC signal representative of both amplitude and phase changes in an applied AC signal. As will be recognized by those skilled in the art, such situations can be accommodated by means of relatively straight forward changes in circuit time constants and clock signal.

The embodiments of the invention in which an exclusive property or privilege is claimed are defined as follows:

1. A circuit for synchronous AC to DC conversion of a differential AC input signal, said circuit including first and second input terminals and first and second output terminals, said circuit comprising:

first and second capacitors, each having first and second electrodes, said second electrode of said first capacitor being electrically connected to said first electrode of said second capacitor to connect said first and second capacitors in series with one another between said first and second output terminals of said circuit;

first and second switched circuit means, each having first and second input terminals and first and second output terminals, said second output terminal of said first switched circuit means and said first output terminal of said second switched circuit means each being connected to the electrically connected first electrode of said second capacitor and second electrode of said first capacitor, said first output terminal of said first switched circuit means being connected to said first output terminal of said circuit without direct electrical connection to said first output terminal of said second switched circuit means, said second output terminal of said second switched circuit means being connected to said second output terminal of said circuit, said first and second input terminals of said first switched circuit means being connected to said first and second input terminals of said circuit for continuously receiving said differential AC signal supplied to said first and second input terminals of said circuit, said first and second input terminals of said second switched input means being connected to said first and second input terminals of said circuit for continuously receiving said differential AC signal substantially 180° out of phase with said differential AC signal that is supplied to said first and second input terminals of said first switched circuit means, said first and second switched circuit means each being switchable between a first operational state in which the switched circuit means senses the amplitude of the differential AC signal applied to the input terminals of the switched circuit means and a second operational state in which the switched circuit means provides a quantity of electrical charge representative of the signal amplitude sensed during operation in the immediately preceding first operational state, each said first and second switched circuit means being switched between said first and second operational states in response to an applied switch actuator signal, said first switched circuit means further including a third capacitor and said second switched circuit means further including a fourth capacitor, said first switched circuit means further including means for switching said third capacitor into a signal path in which a signal applied between said first and second input terminals of said first switched circuit means causes current to flow through said third capacitor when said first switched circuit means is in said first operational state and for switching said third capacitor so that charge stored in said third capacitor is transferred to said first capacitor each time said first switched circuit means is switched to said second operational state, said second switched circuit means further including means for switching said fourth capacitor into a signal path in which a signal applied between said first and second input terminals of said second switched circuit means causes current to flow through said fourth capacitor when said second switched circuit means is in said first operational state and for switching said fourth capacitor so that charge stored in said fourth capacitor is transferred to said second capacitor each time said second switched circuit means is switched to said second operational state; and switch drive means for supplying said switch actuator signal to said first and second switched circuit means to switch said first and second switched circuit means between said first and second operational states with said first and second switched circuit means being switched to opposite ones of said first and second operational states in synchronization with said differential AC signal applied to said first and second input terminals of said circuit.

2. The circuit of claim 1 further comprising first and second resistors, said first resistor being connected between said first input terminal of said circuit and one of said first and second input terminals of both said first and second switched circuit means, said second resistor being connected between said second input terminal of said circuit and the input terminals of both of said first and second switched circuit means that are not connected to said first resistor.

3. A circuit for producing a single ended signal representative of the modulation level of an applied modulated differential AC signal, said circuit having first and second input terminals and first and second output terminals, said circuit comprising:

first and second capacitors each having first and second electrodes and being connected in series with one another between said first and second output terminals;

a third capacitor for charging said first capacitor and a fourth capacitor for charging said second capacitor, each of said third and fourth capacitors having first and second electrodes; and switching means for coupling said third capacitor to said first and second input terminals during each time period in which said applied signal is positive and for connecting said third capacitor in a current loop with said first capacitor to develop a voltage between said first and second electrodes of said first capacitor during each time period in which said applied signal is negative, said switching means further including means for coupling said fourth capacitor to said first and second input terminals of said circuit during each time period in which said applied signal is negative and for connecting said fourth capacitor in a current loop with said second capacitor during each time period in which said applied signal is positive, said switching means connecting said fourth capacitor in said current loop with said second capacitor to develop a voltage between said first and second electrodes of said second capacitor that exhibits the same polarity as the voltage developed between said first and second electrodes of said first capacitor when said switching means connects said third capacitor in said current loop with said first capacitor.

4. The circuit of claim 3 wherein said switching means includes first, second, third and fourth switches, each of said first, second, third and fourth switches being responsive to an applied switch drive signal, each of said first, second, third and fourth switches having first, second and third terminals, each of said first, second, third and fourth switches being responsive to said switch drive signal for switching between a condition in which said first terminal is electrically interconnected with said second terminal and a condition in which said first terminal is electrically interconnected with said third terminal, said first switch being connected to said first electrode of said third capacitor and being responsive to said switch drive signal of said first switch for switching said first electrode of said third capacitor between a condition in which said electrode is interconnected with said first input terminal of said input terminals and a condition in which said first electrode of said third capacitor is interconnected with said first electrode of said first capacitor, said second switch being connected to said second electrode of said third capacitor and being responsive to said switch drive signal of said second switch for switching said second switch between a condition in which said second electrode of said third capacitor is interconnected with said second input terminal of said circuit and a condition in which said second electrode of said third capacitor is interconnected with said second electrode of said first capacitor; said third switch being connected to said first electrode of said fourth capacitor and being responsive to said switch drive signal of said third switch for switching said third switch between a condition in which said third switch interconnects said first electrode of said fourth capacitor with said second input terminal of said circuit and a condition in which said first electrode of said fourth capacitor is interconnected with said first electrode of said second capacitor; said fourth switch being connected to said second electrode of said fourth capacitor and being responsive to said switch drive signal of said fourth switch for switching said second electrode of said fourth capacitor between a condition in which said second electrode of said fourth capacitor is interconnected with said first input terminal of said circuit and a condition in which said second electrode of said fourth capacitor is interconnected with said second electrode of said second capacitor.

5. The circuit of claim 4 wherein said switching means further includes first and second driver circuits for supplying said switch driver signals to said first, second, third and fourth switches; each said first and second driver circuits being connected for receiving a clock signal having a pulse repetition rate that is substantially identical to the frequency of said differential AC signal applied to said first and second input terminals of said circuit; said first driver circuit being connected for supplying said switch driver signals to said first and second switches in substantial synchronization with said clock signal, said second driver circuit being connected for supplying said switch driver signals to said third and fourth switches in phase inversion and in substantial synchronization with said clock signal.

6. The circuit of claim 5 wherein said switching means further includes first and second resistors, said first resistor being connected between said first input terminal of said circuit and said first and fourth switches to limit current flow through said third and fourth capacitors during periods of time in which said third and fourth capacitors are coupled to said first and second input terminals of said circuit by said switching means; said second resistor being connected between said second input terminal of said circuit and said second and third switches to limit current through said third and fourth capacitors during respective periods of time in which said third and fourth capacitors are interconnected with said second input terminal of said circuit.

7. The circuit of claim 3 wherein said switching means includes first, second, third, and fourth pairs of switches, the first and second switches of said first pair of switches being respectively connected to the first and second electrodes of said third capacitor and being responsive to a first applied switch drive signal for interconnecting said third capacitor with said first and second input terminals of said circuit; the first and second switches of said second pair of switches being respectively connected to the first and second electrodes of said fourth capacitor and being responsive to a second applied switch drive signal for interconnecting said fourth capacitor with said first and second input terminals of said circuit; the first and second switches of said third pair of switches being respectively connected to said first and second electrodes of said third capacitor and being responsive to a third applied switch drive signal for interconnecting said third capacitor with said first capacitor; and the first and second switches of said fourth pair of switches being respectively connected to said first and second terminals of said fourth capacitor and being responsive to an applied fourth switch drive signal for interconnecting said fourth capacitor with said second capacitor.

8. The circuit of claim 7 wherein said switching means further includes switch driver means for supplying said first and fourth switch drive signals when said AC signal supplied to said first and second input terminals of said circuit causes said first input terminal to be at a positive potential relative to said second input terminal and for supplying said second and third switch drive signals when a said AC signal supplied to said first and second input terminals of said circuit causes said first input terminal to be at a negative potential relative to said second input terminal.

9. The circuit of claim 8 further comprising first and second resistors, said first and second resistors being respectively connected between the first and second input terminals of said circuit and said first and second electrodes of said third capacitor when said third capacitor is interconnected with said first and second input terminals by means of said first pair of switches; said first and second resistors being respectively interconnected between said first and second input terminals of said circuit and said first and second electrodes of said fourth capacitor when said first and second input electrodes of said fourth capacitor are interconnected with said first and second input terminals of said circuit by means of said second switch pair.

10. The circuit of claim 3 wherein said applied modulated differential AC signal is supplied by an inductive position sensor, said inductive position sensor being responsive to an alternating current reference signal of a predetermined frequency; and wherein said switching means is responsive to a drive signal at said predetermined frequency for coupling said third capacitor to said first and second input terminals during time intervals in which the signal supplied by said inductive position sensor is positive and for connecting said third capacitor in a current loop with said first capacitor to charge said first capacitor and develop a voltage between said first and second electrodes of said first capacitor when said signal supplied by said inductive position sensor is negative, said drive signal at said predetermined frequency, said switching means also being responsive to said drive signal at said predetermined frequency for coupling said fourth capacitor to said first and second input terminals of said circuit when said signal supplied by said inductive position sensor is negative and for connecting said fourth capacitor in a current loop with said second capacitor to charge said second capacitor and develop a voltage between said first and second electrodes of said second capacitor when a positive signal is supplied by said inductive position sensor.

11. The circuit of claim 10, wherein said fourth capacitor charges said second capacitor to develop a voltage of the same polarity as the voltage developed across said first capacitor when said third capacitor charges said first capacitor so that a voltage substantially equal to the sum of the said voltages developed across said first and second capacitors is developed between said first and second output terminals of said circuit.

12. The circuit of claim 11 wherein said switching means includes first, second, third and fourth switches, each of said first, second, third and fourth switches being responsive to an applied switch drive signal, each of said first, second, third and fourth switches having first, second and third terminals, each of said first, second, third and fourth switches being responsive to said switch drive signal for switching between a condition in which said first terminal is electrically interconnected with said second terminal and a condition in which said first terminal is electrically interconnected with said third terminal, said first switch being connected to said first electrode of said third capacitor and being responsive to said switch drive signal of said first switch for switching said first electrode of said third capacitor between a condition in which said electrode is interconnected with said first input terminal of said input terminals and a condition in which said first electrode of said third capacitor is interconnected with said first electrode of said first capacitor, said second switch being connected to said second electrode of said third capacitor and being responsive to said switch drive signal of said second switch for switching said second switch between a condition in which said second electrode of said third capacitor is interconnected with said second input terminal of said circuit and a condition in which said second electrode of said third capacitor is interconnected with said second electrode of said first capacitor; said third switch being connected to said first electrode of said fourth capacitor and being responsive to said switch drive signal of said third switch for switching said third switch between a condition in which said third switch interconnects said first electrode of said fourth capacitor with said second input terminal of said circuit and a condition in which said first electrode of said fourth capacitor is interconnected with said first electrode of said second capacitor; said fourth switch being connected to said second electrode of said fourth capacitor and being responsive to said switch drive signal of said fourth switch for switching said second electrode of said fourth capacitor between a condition in which said second electrode of said fourth capacitor is interconnected with said first input terminal of said circuit and a condition in which said second electrode of said fourth capacitor is interconnected with said second electrode of said second capacitor.

13. The circuit of claim 12 wherein said switching means further includes first and second driver circuits for supplying said switch driver signals to said first, second, third and fourth switches; each said first and second driver circuits being connected for receiving a clock signal having a pulse repetition rate that is substantially identical to the frequency of said differential AC signal applied to said first and second input terminals of said circuit; said first driver circuit being connected for supplying said switch driver signals to said first and second switches in substantial synchronization with said clock signal, said second driver circuit being connected for supplying said switch driver signals to said third and fourth switches in phase inversion and in substantial synchronization with said clock signal.

14. The circuit of claim 11 wherein said switching means includes first, second, third, and fourth pairs of switches, the first and second switches of said first pair of switches being respectively connected to the first and second electrodes of said third capacitor and being responsive to a first applied switch drive signal for interconnecting said third capacitor with said first and second input terminals of said circuit; the first and second switches of said second pair of switches being respectively connected to the first and second electrodes of said fourth capacitor and being responsive to a second applied switch drive signal for interconnecting said fourth capacitor with said first and second input terminals of said circuit; the first and second switches of said third pair of switches being respectively connected to said first and second electrodes of said third capacitor and being responsive to a third applied switch drive signal for interconnecting said third capacitor with said first capacitor; and the first and second switches of said fourth pair of switches being respectively connected to said first and second terminals of said fourth capacitor and being responsive to an applied fourth switch drive signal for interconnecting said fourth capacitor with said second capacitor.

15. The circuit of claim 14 wherein said switching means further includes switch driver means for supplying said first and fourth switch drive signals when said AC signal supplied to said first and second input terminals of said circuit causes said first input terminal to be at a positive potential relative to said second input terminal and for supplying said second and third switch drive signals when said AC signal supplied to said first and second input terminals of said circuit causes said first input terminal to be at a negative potential relative to said second input terminal.

16. The circuit of claim 15 further comprising first and second resistors, said first and second resistors being connected in a circuit path that includes said first and second input terminals of said circuit and said third capacitor when said third capacitor is interconnected with said first and second input terminals by means of said first pair of switches; said first and second resistors being connected in a circuit path that includes said first and second input terminals of said circuit and said fourth capacitor when said fourth capacitor is interconnected with said first and second input terminals of said circuit by means of said second switch pair.

* * * * *